United States Patent
Uchiyama

(10) Patent No.: US 9,782,921 B2
(45) Date of Patent: Oct. 10, 2017

(54) INJECTION MOLDING SYSTEM WITH ADDITIONAL INJECTION DEVICE

(71) Applicant: FANUC Corporation, Yamanashi (JP)

(72) Inventor: Tatsuhiro Uchiyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 38 days.

(21) Appl. No.: 15/051,016

(22) Filed: Feb. 23, 2016

(65) Prior Publication Data

US 2016/0243741 A1 Aug. 25, 2016

(30) Foreign Application Priority Data

Feb. 24, 2015 (JP) .................................. 2015-033618

(51) Int. Cl.
   *B29C 45/76* (2006.01)
   *B29C 45/13* (2006.01)
   *B29C 45/84* (2006.01)

(52) U.S. Cl.
   CPC .......... *B29C 45/7666* (2013.01); *B29C 45/13* (2013.01); *B29C 45/84* (2013.01); *B29C 2945/76521* (2013.01); *B29C 2945/76702* (2013.01); *B29C 2945/76792* (2013.01)

(58) Field of Classification Search
   CPC  B29C 2945/76521; B29C 2945/76702; B29C 2945/76792; B29C 45/13; B29C 45/7666; B29C 45/84
   See application file for complete search history.

(56) References Cited

U.S. PATENT DOCUMENTS

| 2009/0065973 A1 | 3/2009 | Jung et al. |
| 2014/0021805 A1* | 1/2014 | Koyama ................. F16P 3/005 307/328 |
| 2014/0152230 A1* | 6/2014 | Hosoya ............... B29C 45/7666 318/625 |

FOREIGN PATENT DOCUMENTS

| DE | 102006016200 A1 | 10/2007 |
| JP | 4-278322 A | 10/1992 |
| JP | 6-344374 A | 12/1994 |
| JP | 2000-37758 A | 2/2000 |
| JP | 2001-079877 A | 3/2001 |
| JP | 2001-121572 A | 5/2001 |
| JP | 2002-187184 A | 7/2002 |
| JP | 2003-225938 A | 8/2003 |

(Continued)

OTHER PUBLICATIONS

Office Action in JP Application No. 2015-033618, mailed May 24, 2016.

(Continued)

*Primary Examiner* — Jill Heitbrink
(74) *Attorney, Agent, or Firm* — Hauptman Ham, LLP

(57) ABSTRACT

An injection molding machine and an additional injection device are provided such that a power interruption signal is output to a controller of the injection molding machine or the additional injection device on the destination when it is detected that a movable door is opened and a state of position confirmation means for the movable door is transmitted to the injection molding machine or the additional injection device on the destination through a communication line. Thus, the state of the position confirmation means can be transmitted and notified without decreasing maintainability.

2 Claims, 4 Drawing Sheets

(56) References Cited

FOREIGN PATENT DOCUMENTS

JP    2007-230113 A    9/2007
JP    2011-240689 A    12/2011

OTHER PUBLICATIONS

Decision to Grant a Patent in JP Application No. 2015-033618, mailed Aug. 30, 2016.
Office Action in DE Application No. 102016001882.8, dated Jul. 10, 2017.

* cited by examiner

INJECTION MOLDING SYSTEM WITH ADDITIONAL INJECTION DEVICE

RELATED APPLICATIONS

The present application claims priority to Japanese Application Number 2015-033618, filed Feb. 24, 2015, the disclosure of which is hereby incorporated by reference herein in its entirety.

BACKGROUND OF THE INVENTION

Field of the Invention

The present invention relates to an injection molding system, and more particularly, to an injection molding system for multi-color molding or multi-component molding, comprising an injection molding machine provided with an additional injection device.

Description of the Related Art

There is an increasing demand for injection molding machines capable of molding integral molded articles using a plurality of colors or materials. In order to mold these molded articles, a single injection molding machine is mounted with a plurality of injection devices, which serve for successive injection. In this way, molded articles can be molded from materials of a plurality of colors or types. This molding method is called multi-component or multi-color molding, on account of the use of different resin materials or the same resin material of different colors in a plurality of injection devices. In the description herein, these molding methods will be generally called the multi-component molding methods, and the injection molding machine with a plurality of injection devices for the multi-component molding will be referred to as the multi-component molding machine.

The multi-component molding machine used may be a dedicated machine comprising a plurality of injection devices previously arranged around a single mold clamping device or a general-purpose machine in which an general-purpose injection molding machine comprising a single mold clamping device and a single injection device is provided with additional injection devices extending at right angles to the injection direction of the injection molding machine.

Techniques particularly related to multi-color, multi-component molding machines of the dedicated machine type are disclosed in Japanese Patent Applications Laid-Open No. 2001-79877 and No. 2001-121572.

In an injection molding machine, moreover, a device is provided with some movable doors. These movable doors are configured to be closed during the operation of the injection molding machine and opened when a molded article is to be removed from a mold or a discharged resin is to be removed and discarded. Thus, the movable doors are necessary for molding work. When the movable doors are open, however, movable parts of the injection molding machine are accessible, so that power in the injection molding machine is interrupted for the safety of operators.

Japanese Patent Applications Laid-Open No. 2000-37758, No. 4-278322, No. 2007-230113, No. 2002-187184, and No. 2011-240689 disclose techniques in which power in injection molding machines is thus interrupted for the safety of operators when movable doors of the injection molding machines are opened.

Although the techniques related to the multi-color, multi-component molding machines of the dedicated machine type are disclosed in Japanese Patent Applications Laid-Open No. 2001-79877 and No. 2001-121572, particulars related to the open/close operation of movable doors of the molding machines are not.

Although the open/close operation of the movable doors of the injection molding machines and interruption of the operation of the molding machines are disclosed in Japanese Patent Applications Laid-Open No. 2000-37758, No. 4-278322, No. 2007-230113, No. 2002-187184, and No. 2011-240689, cooperation between movable doors of respective injection devices of the multi-color, multi-component molding machines and the like are not.

According to the multi-component molding machine in which the injection molding machine and the additional injection devices additionally attached thereto are connected to one another, operators' safety sometimes cannot be secured by only interrupting power in the device of which a movable door is opened.

This case will be described with reference to FIG. 2. FIG. 2 is a top view of an injection molding machine 1 for multi-color, multi-component molding. Numeral 10 denotes an injection mechanism section, numeral 14 denotes a mold clamping mechanism section, numeral 16a denotes a fixed mold and numeral 16b denotes a movable mold, respectively. The injection mechanism section 10 injects a resin (not shown) into the fixed mold 16a. The mold clamping mechanism section 14 serves to move the movable mold 16b forward and backward so that mold clamping is achieved by the fixed mold 16a and the movable mold 16b. The fixed mold 16a and the movable mold 16b define a mold operation area 18. Further, numerals 12a and 12b individually denote movable doors attached to the injection molding machine 1.

The injection molding machine 1 is additionally provided with an additional injection device 2 for multi-component molding. Numeral 20 denotes an injection mechanism section of the additional injection device 2, and numeral 28 denotes an area for resin discharge from the injection mechanism section 20. Further, numerals 22a and 22b individually denote movable doors attached to the additional injection device 2.

In the multi-component molding machine thus constructed so that the injection molding machine 1 and the additional injection device 2 are connected to each other, an operator's hand or the like is allowed to access the other injection device when the movable doors are opened. If the movable doors 22 (22a and 22b) on the side of the additional injection device 2 are opened, for example, the operator can access the mold operation area 18 on the side of the injection molding machine 1, as well as the resin discharge area 28 on the side of the additional injection device 2. If the hot resin is discharged from the additional injection device 2 when the movable doors 22 on the side of the additional injection device 2 are open, therefore, it is necessary to interrupt power in the injection mechanism section 10 and the mold clamping mechanism section 14 of the injection molding machine 1, as well as power in the additional injection device 2, as a safety measure to prevent the operator from getting burned.

To perform this safety measure, the open/close states of the movable doors are reciprocally input and output between the injection molding machine 1 and the additional injection device 2. When the movable doors 12 on the side of the injection molding machine 1 are opened, the power on the side of the additional injection device 2, as well as the power on the side of the injection molding machine 1, is interrupted. When the movable doors 22 on the side of the additional injection device 2 are opened, in contrast, it is necessary only that the power on the side of the injection molding machine 1, as well as the power on the side of the additional injection device 2, be interrupted.

The injection molding machine 1 comprises the plurality of movable doors 12 (12a and 12b), which are each provided with a plurality of switches (not shown) for confirmation of opened and closed positions. If state signals from all the position confirmation switches on the movable doors and those from position confirmation switches on other movable doors are reciprocally input and output between the injection molding machine 1 and the additional injection device 2, therefore, the number of signals increases, possibly wire arrangement is complicated.

Thus, in order to prevent the increase of the number of signals between the injection molding machine 1 and the additional injection device 2, the machine 1 and the device 2 are individually provided with controllers, which can determine whether or not either of the movable doors 12 of the injection molding machine 1 is opened. If the result of the determination is output to the controller of the additional injection device 2, the wire arrangement can be simplified. The wire arrangement can also be simplified if the result of determination of whether or not either of the movable doors 22 of the additional injection device 2 is opened, in contrast, is output to the controller of the injection molding machine 1.

With this configuration, the wire arrangement between the injection molding machine 1 and the additional injection device 2 can be simplified. In each of the controllers of the machine 1 and the device 2, however, a signal indicative of the result of determination of whether or not either of the movable doors is opened is output to the destination controller. Accordingly, the destination controller having received the signal cannot identify the movable doors of which the position confirmation switches are operated. If any of the position confirmation switches is out of order, therefore, detection of the disabled switch takes time, possibly decreasing maintainability.

SUMMARY OF THE INVENTION

Accordingly, the object of the present invention is to provide an injection molding system in which wire arrangement between devices is simplified without decreasing maintainability.

An injection molding system according to the present invention comprises an injection molding machine, an injection molding machine controller for controlling the injection molding machine, at least one additional injection device, an additional injection device controller for controlling the additional injection device, power interruption signal transmission means configured to transmit a power interruption signal between the injection molding machine controller and the additional injection device controller, a communication line through which a state of position confirmation means for a movable door is transmitted between the injection molding machine controller and the additional injection device controller, and notification means. The injection molding machine comprises at least one injection molding machine movable door and position confirmation means for the injection molding machine movable door, capable of detecting an open/close state of the injection molding machine movable door. The injection molding machine controller outputs a power interruption signal to the additional injection device controller through the power interruption signal transmission means when it is detected by the position confirmation means for the injection molding machine movable door that the injection molding machine movable door is opened. The additional injection device comprises at least one additional injection device movable door and position confirmation means for the additional injection device movable door, capable of detecting an open/close state of the additional injection device movable door. The additional injection device controller outputs a power interruption signal to the injection molding machine controller through the power interruption signal transmission means when it is detected by the position confirmation means for the additional injection device movable door that the additional injection device movable door is opened. The injection molding machine controller obtains the state of the position confirmation means for the additional injection device movable door through the communication line and/or the additional injection device controller obtains the state of the position confirmation means for the injection molding machine movable door through the communication line. The state of the position confirmation means for the additional injection device movable door and/or the state of the position confirmation means for the injection molding machine movable door is notified by the notification means.

Thus, power can be interrupted when it is detected that a movable door is opened and the state of position confirmation means can be transmitted with simple wire arrangement without decreasing maintainability.

The notification means may be configured to notify a screen image based on the state of the position confirmation means for the additional injection device movable door and/or the state of the position confirmation means for the injection molding machine movable door. Thus, an operator can easily perceive the states of the position confirmation means for the additional injection device movable door and the injection molding machine movable door.

According to the present invention, there can be provided an injection molding system in which wire arrangement between devices is simplified without decreasing maintainability.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
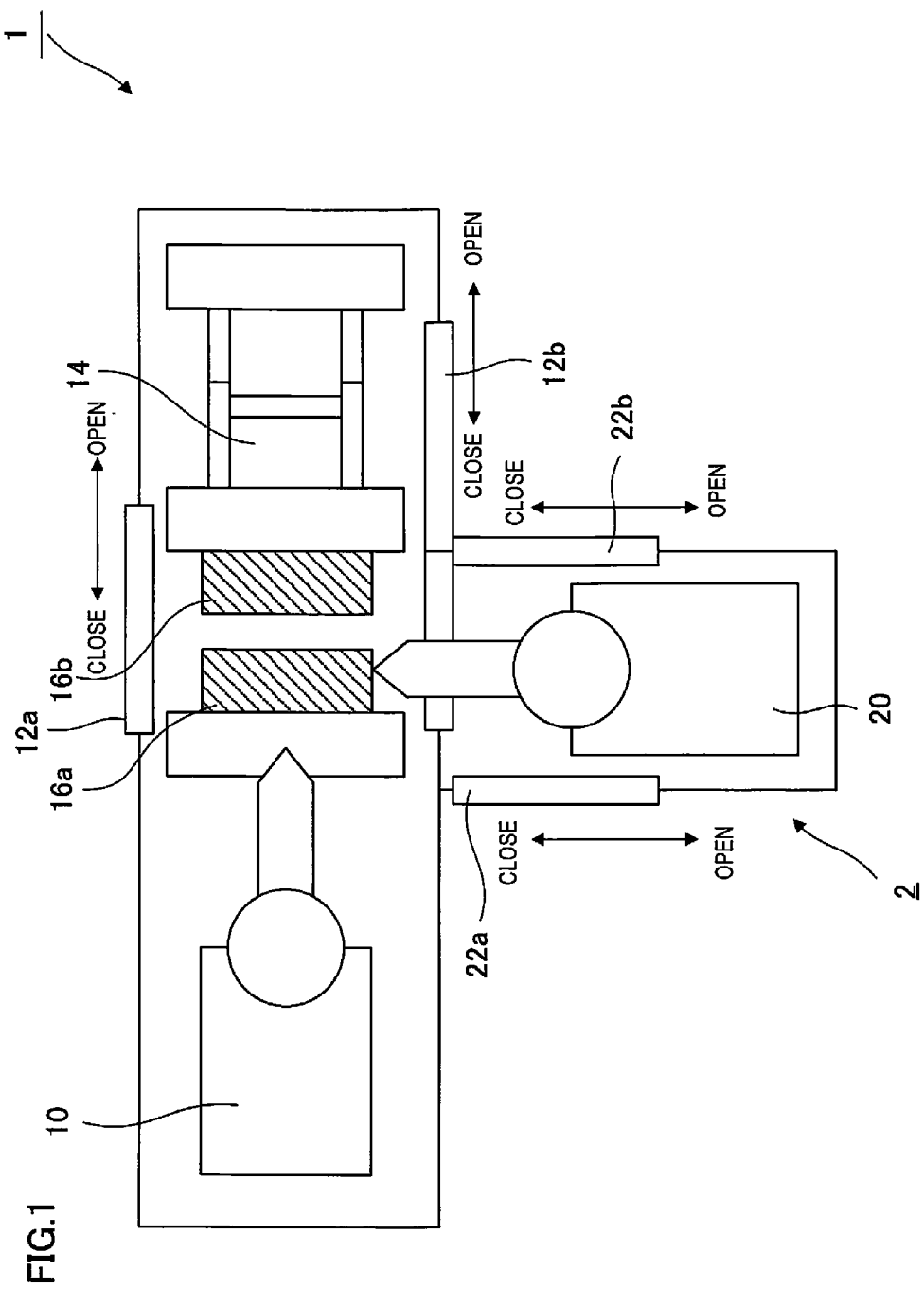
FIG. 1 is a top view of an injection molding machine for multi-color, multi-component molding.
Figure 2:
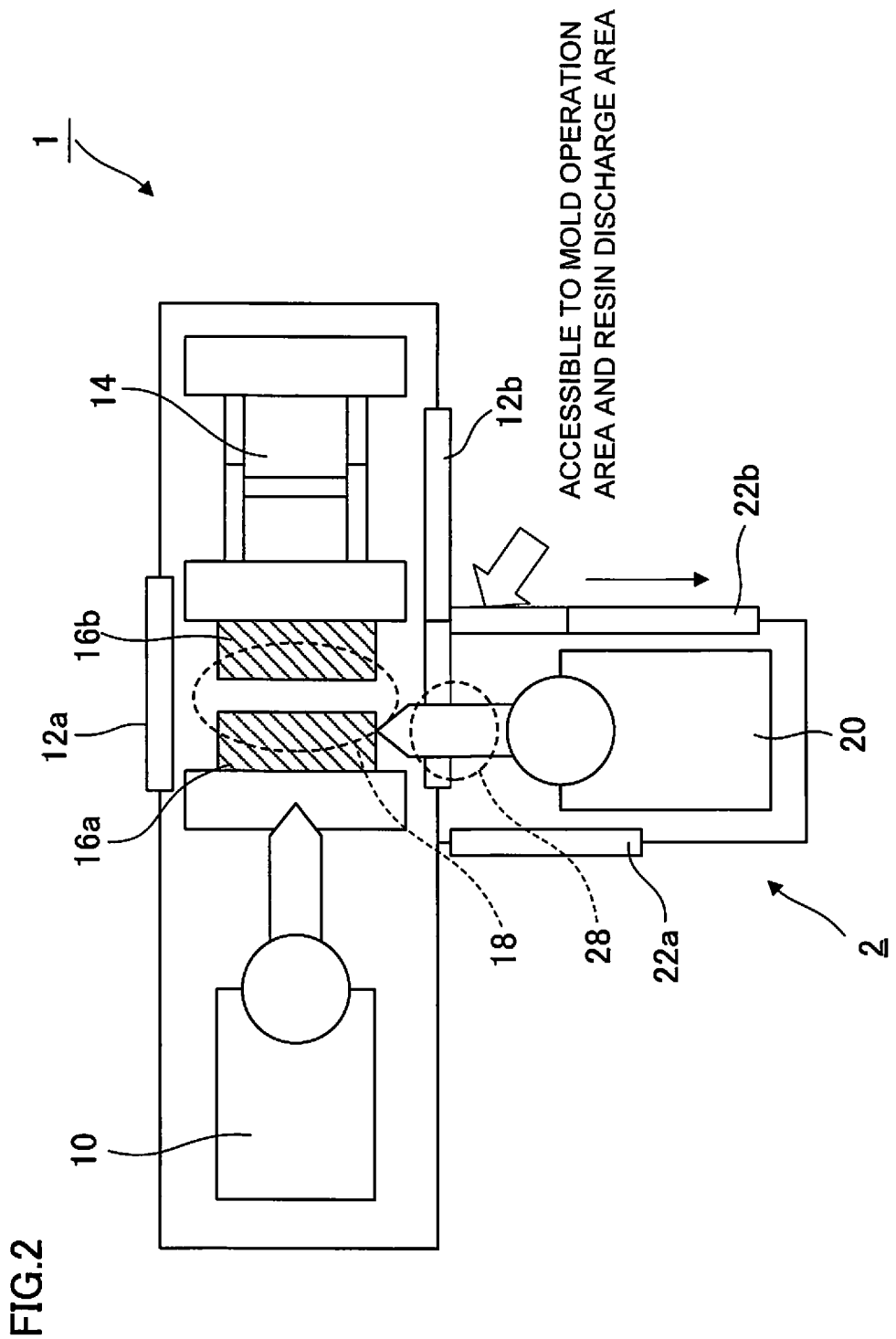
FIG. 2 is a top view of the injection molding machine for multi-color, multi-component molding.

An embodiment of the present invention will now be described with reference to the accompanying drawings. FIG. 1 and FIG. 2 are top views of the injection molding machine 1 for multi-color, multi-component molding. FIG. 1 is a view showing a state in which the movable doors 12 on the side of the injection molding machine 1 and the movable doors 22 on the side of the additional injection device 2 are all closed. FIG. 2 is a view showing an open state of the movable door 22b on the side of the additional injection device 2. In the state of FIG. 2, an operator can access not only the resin discharge area 28 on the side of the additional injection device 2, but the mold operation area 18 on the side of the injection molding machine 1. As described above, therefore, it is necessary to interrupt the power in the injection mechanism section 10 and the mold clamping mechanism section 14 of the injection molding machine 1, as well as the power in the additional injection device 2, lest the operator get burned when a hot resin is discharged from the additional injection device 2.

Figure 3:
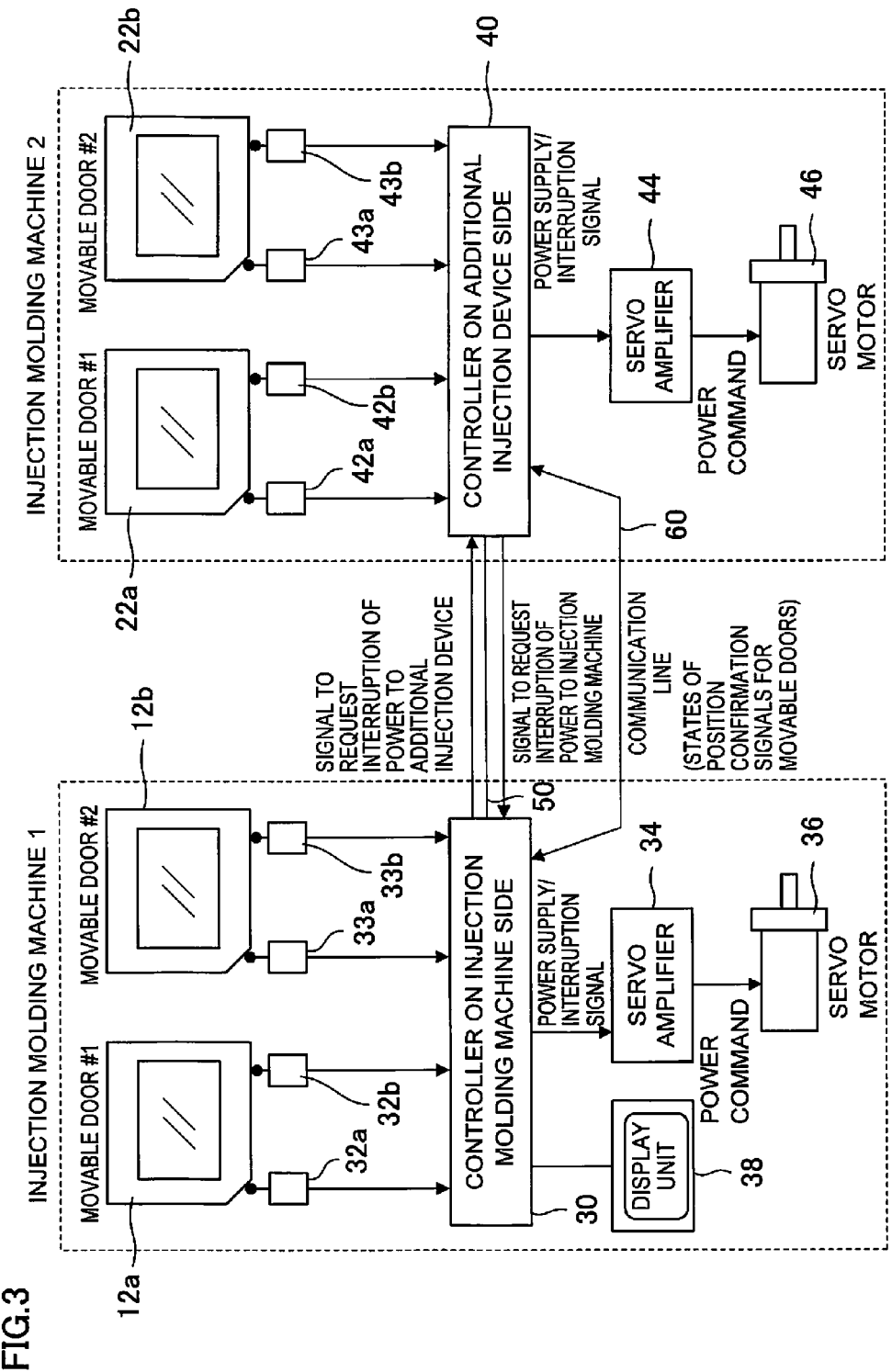
FIG. 3 is a block diagram of an injection molding machine for multi-color, multi-component molding according to an embodiment of the present invention.

FIG. 3 is a block diagram of a multi-component molding machine of the present embodiment comprising the injection molding machine 1 and one additional injection device 2.

A controller 30 on the injection molding machine is provided in the injection molding machine 1. The controller 30 is connected to movable door position confirmation switches (32a, 32b, 33a and 33b), individually disposed on movable doors #1 (12a) and movable doors #2 (12b) in the injection molding machine 1, a display unit 38, and a servo amplifier 34. In the state of the injection molding machine 1 shown in FIG. 3, both the movable doors 12 are closed. Both the position confirmation switches 32a and 33a are configured to be turned off when the movable doors are closed. Both the position confirmation switches 32b and 33b are configured to be turned on when the movable doors are closed.

As described later, the display unit 38 is a device that performs display based on the states of the movable door position confirmation switches. The servo amplifier 34 receives a power supply/interruption signal from the controller 30 on the injection molding machine and issues a power command to a servomotor 36, thereby activating the servomotor 36.

The additional injection device 2 is constructed substantially in the same manner as the injection molding machine 1, and a controller 40 on the additional injection device is provided in the additional injection device 2. The controller 40 is connected to movable door position confirmation switches (42a, 42b, 43a and 43b), individually disposed on movable doors #1 (22a) and movable doors #2 (22b) in the additional injection device 2, and a servo amplifier 44. In the state of the additional injection device 2 shown in FIG. 3, both the movable doors 22 are closed. Both the position confirmation switches 42a and 43a are configured to be turned off when the movable doors are closed. Both the position confirmation switches 42b and 43b are configured to be turned on when the movable doors are closed. The servo amplifier 44 receives a power supply/interruption signal from the controller 40 on the additional injection device and issues a power command to a servomotor 46, thereby activating the servomotor 46.

Further, the controller 30 on the injection molding machine and the controller 40 on the additional injection device are connected to each other by a signal line 50 and a communication line 60. The signal line 50 serves to transmit a signal to request power interruption to the destination controller when the movable doors are opened in the injection molding machine 1 and the additional injection device 2, for example. On the other hand, the communication line 60 serves to transfer the states of position confirmation signals for the movable doors of the injection molding machine 1 and the additional injection device 2.

In the present embodiment, the respective controllers (30 and 40) of the injection molding machine 1 and the additional injection device 2 determine whether or not the movable doors are opened, based on the states of the position confirmation switches of the movable doors. Then, the controllers determine whether or not it is necessary to notify any other controllers than themselves that the movable doors are opened. In other words, the controllers determine whether or not it is necessary to interrupt the power of any other controllers than themselves when the relevant movable doors are opened. According to the result of the determination, a signal to request power interruption is output to the controllers of necessary ones of the connected additional injection devices 2 when the movable doors of the injection molding machine 1 are opened. If the movable doors of any of the additional injection devices 2 are opened, on the other hand, a signal to request power interruption is output to the controller of the injection molding machine 1.

The device (injection molding machine 1 or additional injection device 2) to which the signal to request the power interruption is input cannot identify the operated movable doors of the device (additional injection device 2 or injection molding machine 1) having requested the interruption by the request signal only. Moreover, the device concerned cannot identify the movable doors of which the position confirmation switches are operated, either. Therefore, the controller of at least either of the devices transmits the states of the position confirmation switches of the movable doors of the device provided with the controller concerned to the controller of the other device through the communication line. In this way, the controller can obtain the states of the position confirmation switches of the movable doors of the other device, in addition to those of the position confirmation switches of the movable doors of the device provided with the controller concerned. The use of the communication line 60 is advantageous in that more signals and information can be transmitted and received with saved wiring than in the case where the signals are directly input and output between the controllers through the signal line 50 for the transfer of the signal to request the interruption, although the transmission and reception of the signals and information are more time-consuming. Serial communication, such as Ethernet (registered trademark) or RS-232-C, is applicable to a communication system based on the communication line.

Figure 4:
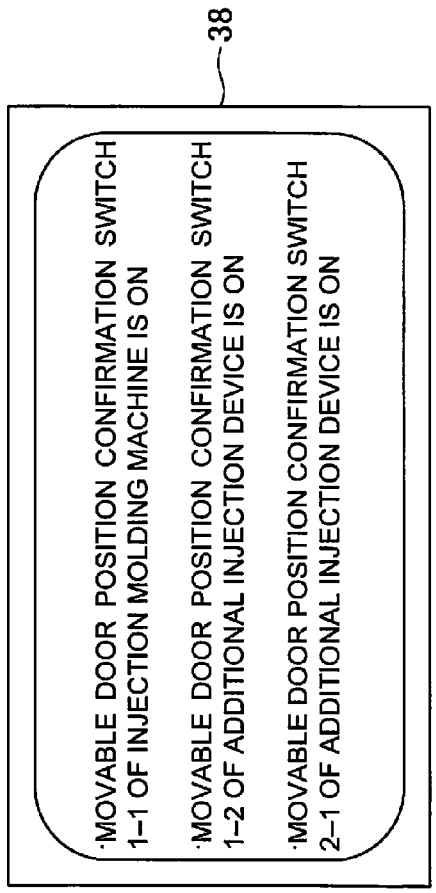
FIG. 4 is a diagram showing an example of display in a display unit.

On receiving the states of the position confirmation switches of the movable doors, the controller displays state signals from the movable door position confirmation switches on the display unit 38 connected thereto. FIG. 4 shows an example in which the states of the position confirmation switches (32 and 33) of the injection molding machine 1 and the states of the position confirmation switches (42 and 43) of the additional injection device 2 are displayed on the display unit 38 of the injection molding machine 1. Since the operator mainly operates the injection molding machine 1, it is necessary only that the injection molding machine 1 be provided with the display unit 38 so that the states of the position confirmation switches (32 and 33) of the movable doors 12 of the injection molding machine 1 and the states of the position confirmation switches (42 and 43) of the movable doors 22 of the additional injection device 2 can all be displayed on the display unit 38. Alternatively, the injection molding machine 1 and the additional injection device 2 should only be provided with their respective display units so that the states of the position confirmation switches (32 and 33) of the movable doors 12 of the injection molding machine 1 and the states of the position confirmation switches (42 and 43) of the movable doors 22 of the additional injection device 2 can be individually displayed on the display units. Image-based notification according to the present invention also involves an embodiment in which the states of the position confirmation switches are displayed as character information on the display unit 38.

Although the states of all the position confirmation switches can be displayed, moreover, only the states of activated position confirmation switches may be displayed. Further, the respective states of the position confirmation switches may be displayed when it is detected by the switches that the movable doors are closed or opened.

In the display example shown in FIG. 4, the states of the position confirmation switches (32 and 33) of the movable doors 12 of the injection molding machine 1 and the states of the position confirmation switches (42 and 43) of the movable doors 22 of the additional injection device 2 are all displayed on a single screen. Alternatively, as shown in FIG. 5, the states of the position confirmation switches (32 and 33) of the movable doors 12 of the injection molding machine 1 and the states of the position confirmation switches (42 and 43) of the movable doors 22 of the additional injection device 2 may be individually displayed so that the display can be changed by the operator's operation or the like.

In the embodiment described herein, moreover, the signal states of the position confirmation switches of the movable doors are output through the communication line 60. Alternatively, however, screen images indicative of the signal states of the position confirmation switches of the movable doors may be individually created by the controllers in the injection molding machine and the additional injection device. The controller having created the screen images may be configured to transfer the created images to the controller of the other device through the communication line 60 so that the controller having received the transferred screen images can display the received images on the display device. Also in this case, as shown in FIG. 5, the states of the position confirmation switches are displayed for each individual device.

Figure 5:
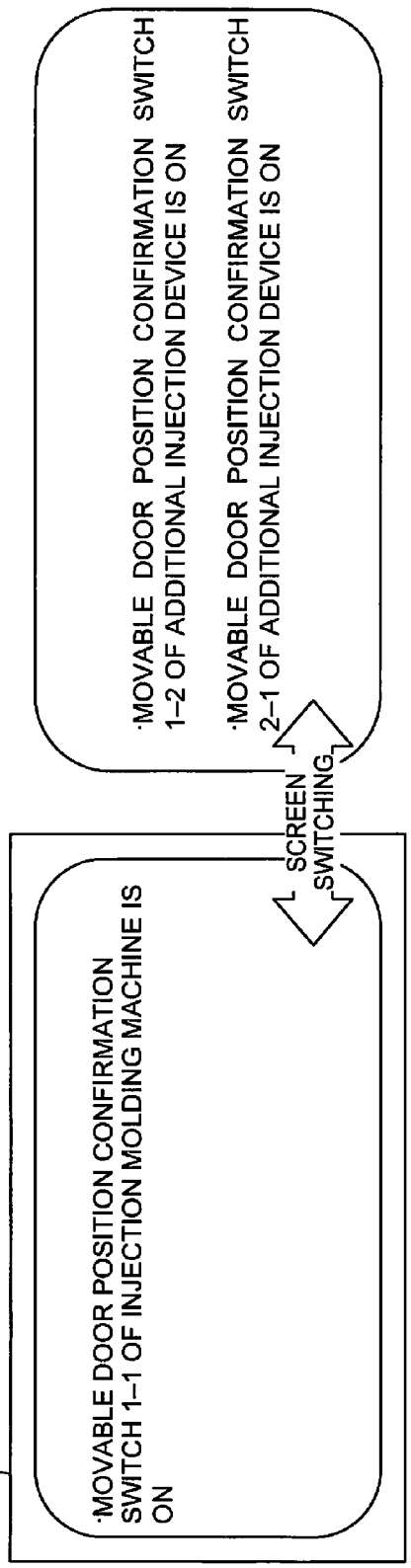
FIG. 5 is a diagram showing an example of display in the display unit.

In the examples shown in FIGS. 4 and 5, furthermore, the states of the position confirmation switches are displayed by characters on the display unit 38. Alternatively, however, figures of the position confirmation switches may be displayed so that the states of the switches can be illustrated. As shown in FIG. 2, moreover, an overall view of the injection molding machine 1 and the additional injection device 2 may be displayed on the display unit 38 so that the open state of the movable doors and the like can be displayed based on the positions of the movable doors in the overall view. Furthermore, the operator may be notified of the states by sound or light generating means, such as a buzzer or a lamp.

The invention claimed is:

1. An injection molding system comprising:
an injection molding machine;
an injection molding machine controller for controlling the injection molding machine;
at least one additional injection device;
an additional injection device controller for controlling the additional injection device;
power interruption signal transmission means configured to transmit a power interruption signal between the injection molding machine controller and the additional injection device controller;
a communication line through which a state of position confirmation means for a movable door is transmitted between the injection molding machine controller and the additional injection device controller; and
notification means,
wherein the injection molding machine comprises at least one injection molding machine movable door and position confirmation means for the injection molding machine movable door, capable of detecting an open/close state of the injection molding machine movable door,
the injection molding machine controller outputs a power interruption signal to the additional injection device controller through the power interruption signal transmission means when it is detected by the position confirmation means for the injection molding machine movable door that the injection molding machine movable door is opened,
the additional injection device comprises at least one additional injection device movable door and position confirmation means for the additional injection device movable door, capable of detecting an open/close state of the additional injection device movable door,
the additional injection device controller outputs a power interruption signal to the injection molding machine controller through the power interruption signal transmission means when it is detected by the position confirmation means for the additional injection device movable door that the additional injection device movable door is opened,
the injection molding machine controller obtains the state of the position confirmation means for the additional injection device movable door through the communication line and/or the additional injection device controller obtains the state of the position confirmation means for the injection molding machine movable door through the communication line, and
the state of the position confirmation means for the additional injection device movable door and/or the state of the position confirmation means for the injection molding machine movable door is notified by the notification means.

2. The injection molding system according to claim 1, wherein the notification means notifies a screen image based on the state of the position confirmation means for the additional injection device movable door and/or the state of the position confirmation means for the injection molding machine movable door.

* * * * *